(No Model.) 7 Sheets—Sheet 1.
L. RIBEREAU Y MARTEAUX.
MACHINE FOR MAKING MOLDS.

No. 519,310. Patented May 1, 1894.

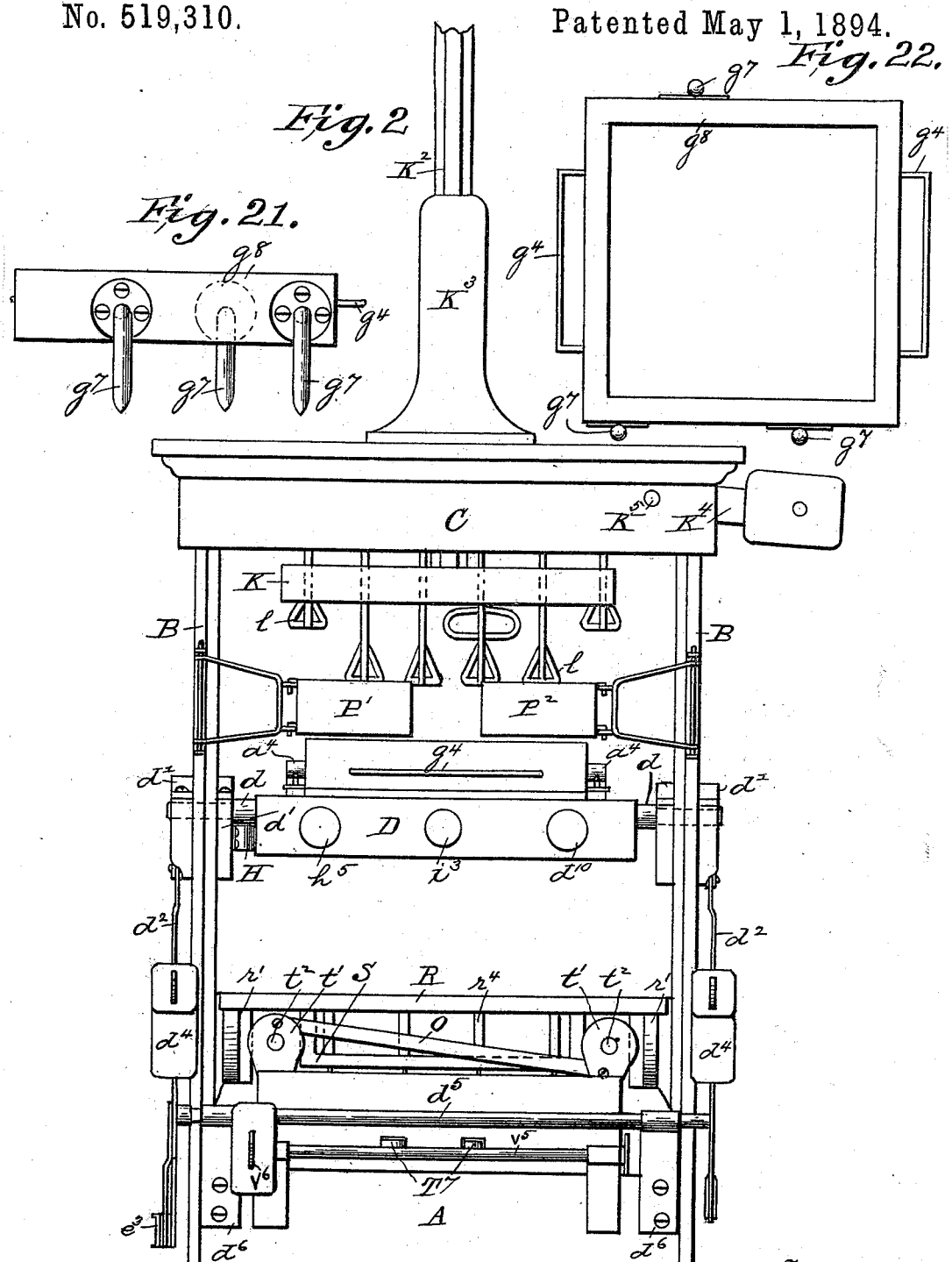

(No Model.) 7 Sheets—Sheet 3.
L. RIBEREAU Y MARTEAUX.
MACHINE FOR MAKING MOLDS.
No. 519,310. Patented May 1, 1894.
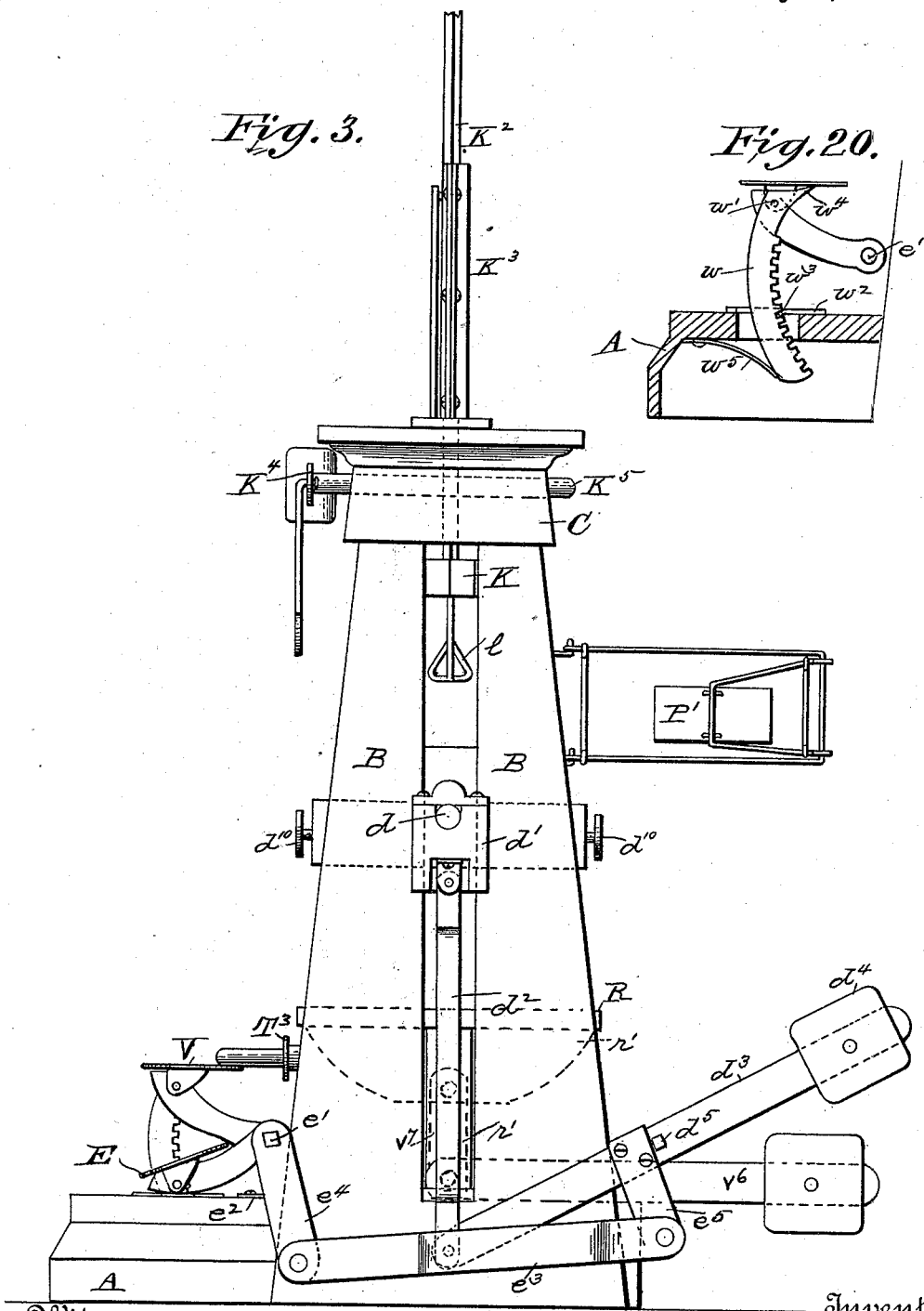
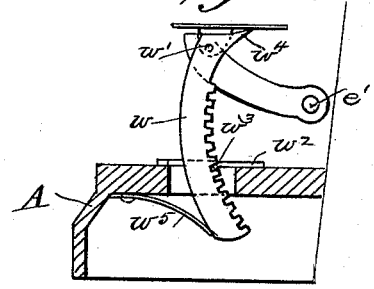
Witnesses
Jas H Blackwood
R. F. Heck.
Inventor
Louis Ribereau
by W. R. Doolittle
Attorney
THE NATIONAL LITHOGRAPHING COMPANY,
WASHINGTON, D. C.

(No Model.) 7 Sheets—Sheet 4.
L. RIBEREAU Y MARTEAUX.
MACHINE FOR MAKING MOLDS.
No. 519,310. Patented May 1, 1894.
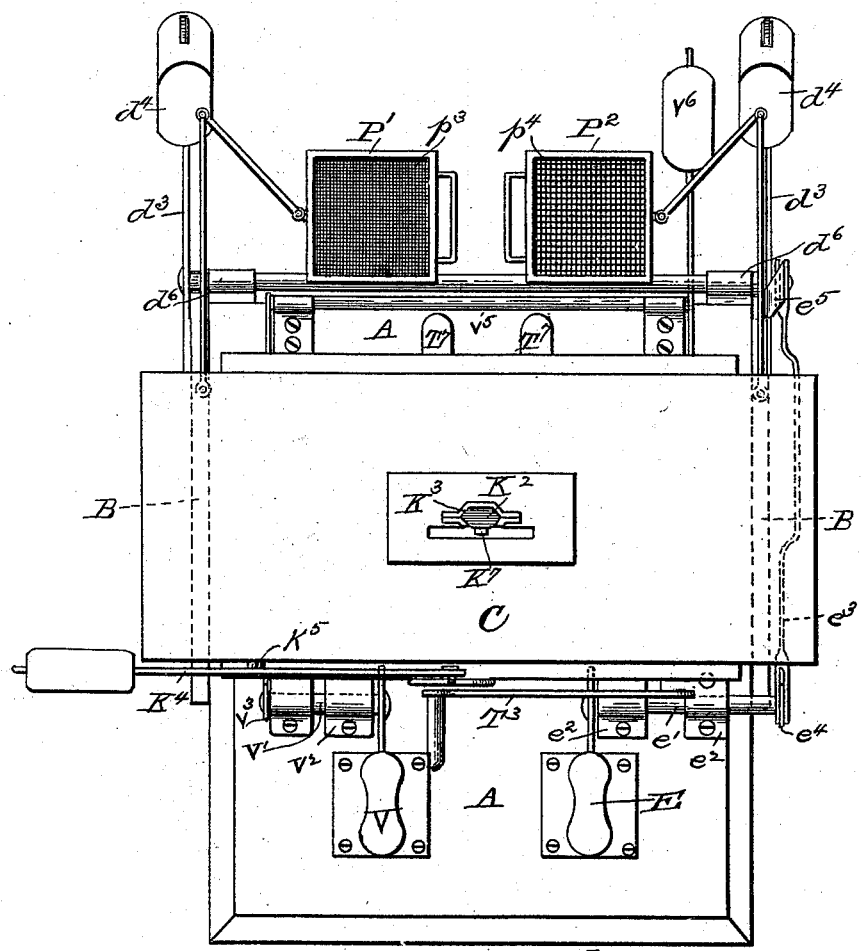
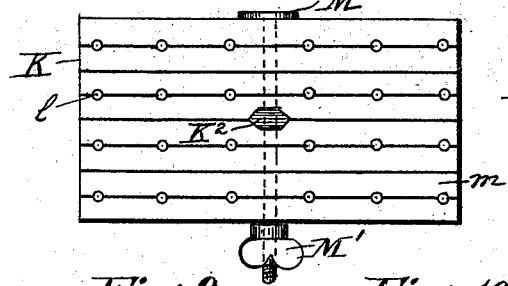
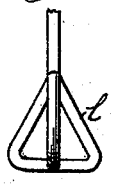
Witnesses
Jos H Blackwood
R. F. Heck
Inventor
Louis Ribereau y Marteaux
by M. Doolittle
Attorney

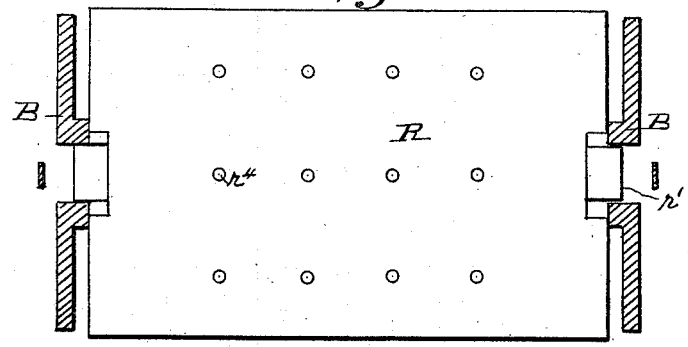
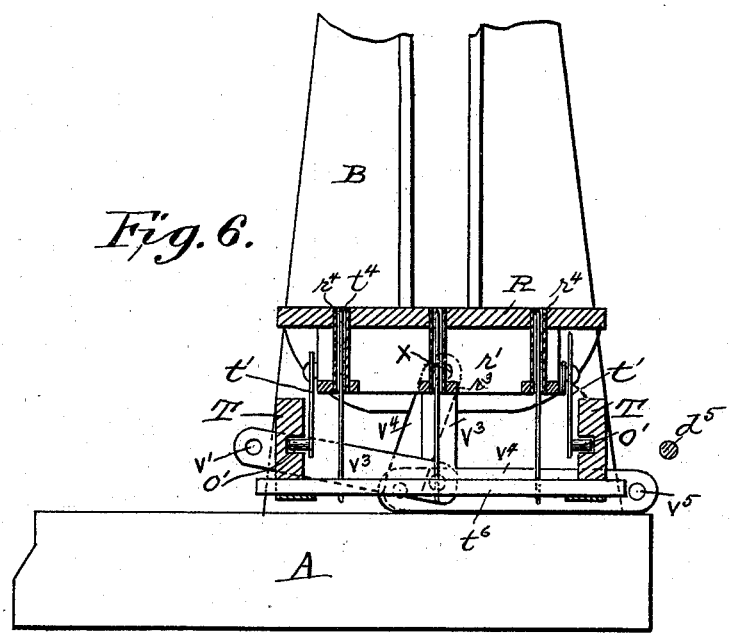
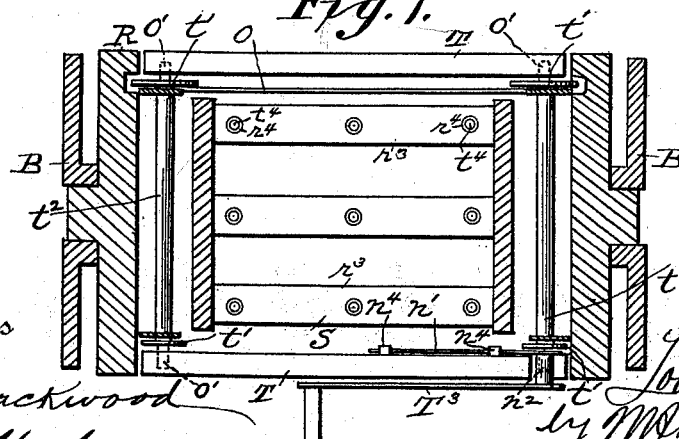

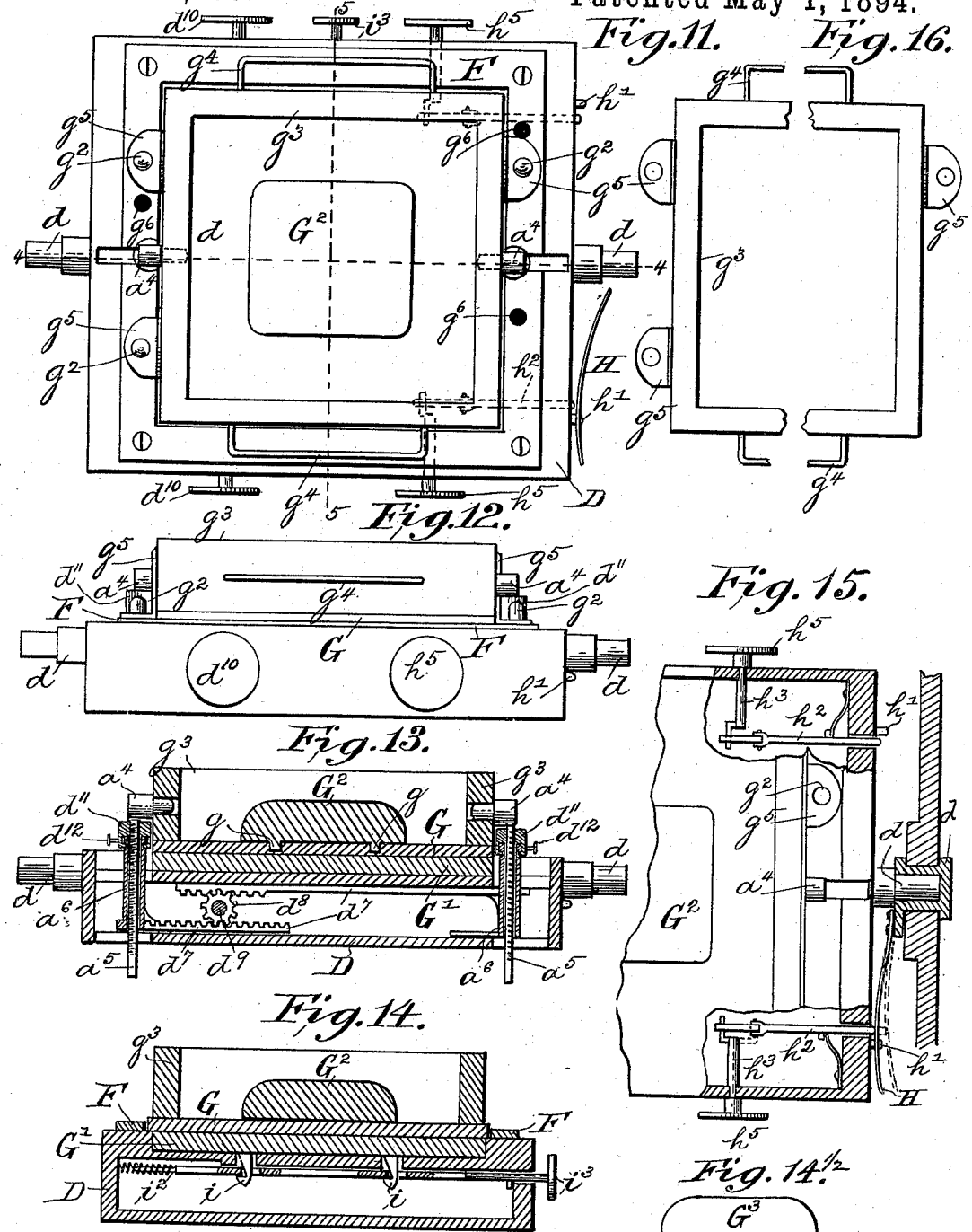

(No Model.) 7 Sheets—Sheet 7.

L. RIBEREAU Y MARTEAUX.
MACHINE FOR MAKING MOLDS.

No. 519,310. Patented May 1, 1894.

Witnesses
Jas H Blackwood
R. F. Heck.

Inventor
Louis Ribereau y Marteaux
by W H Doolittle
Attorney

UNITED STATES PATENT OFFICE.

LOUIS RIBEREAU Y MARTEAUX, OF HAVANA, CUBA.

MACHINE FOR MAKING MOLDS.

SPECIFICATION forming part of Letters Patent No. 519,310, dated May 1, 1894.

Application filed August 4, 1893. Serial No. 482,386. (No model.)

*To all whom it may concern:*

Be it known that I, LOUIS RIBEREAU Y MARTEAUX, a subject of the King of Spain, residing at Havana, Cuba, have invented certain new and useful Improvements in Machines for Making Molds; and I do hereby declare the following to be a full, clear, and exact description of the invention, such as will enable others skilled in the art to which it appertains to make and use the same.

My invention relates to a machine for making molds of all varieties and its principal objects are to simplify and render more efficient a machine of this character.

It consists of the parts and combination of parts as hereinafter described and particularly claimed.

It is illustrated in the accompanying drawings, in which—

Figure 1:
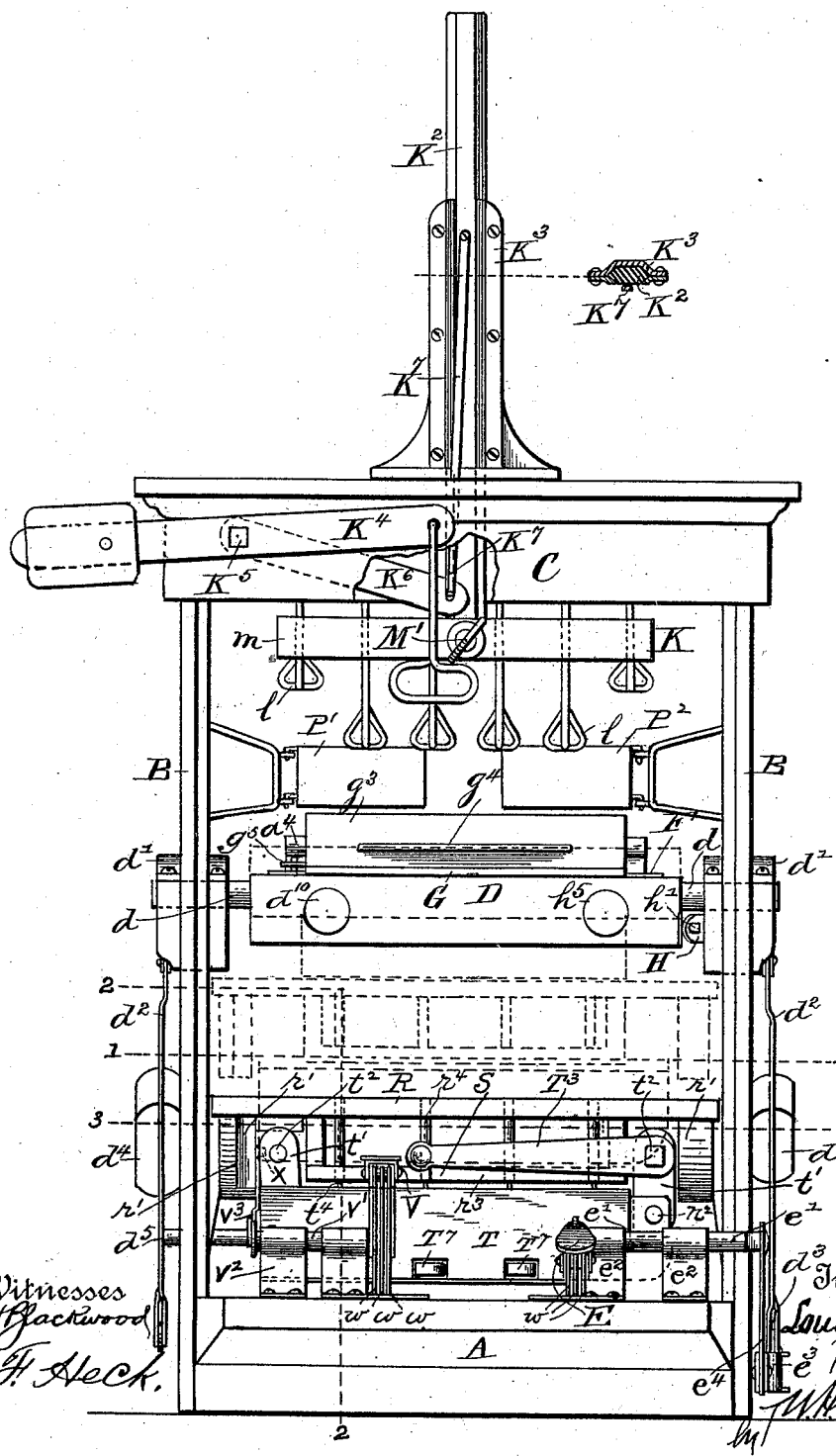
Figure 17:
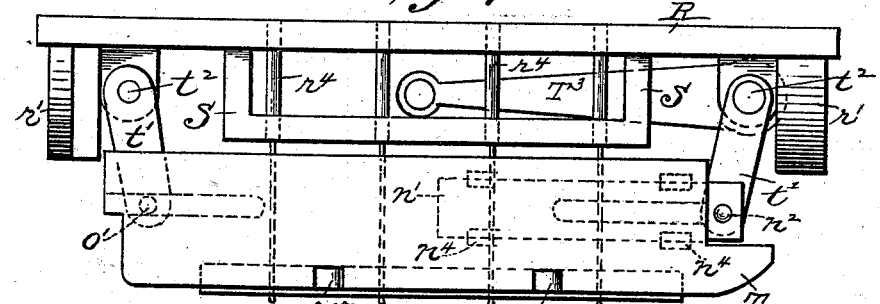
Figure 18:
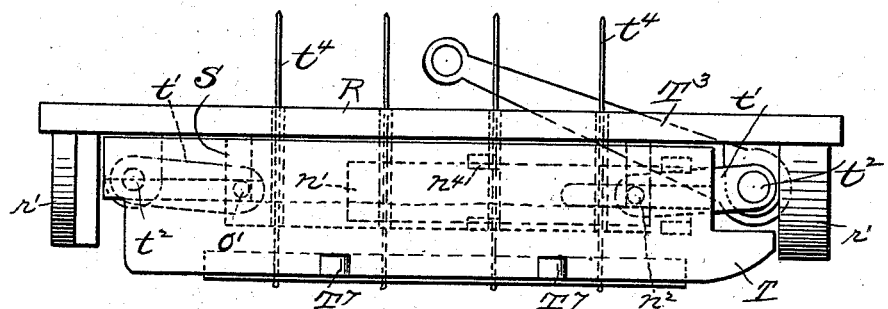
Figure 19:
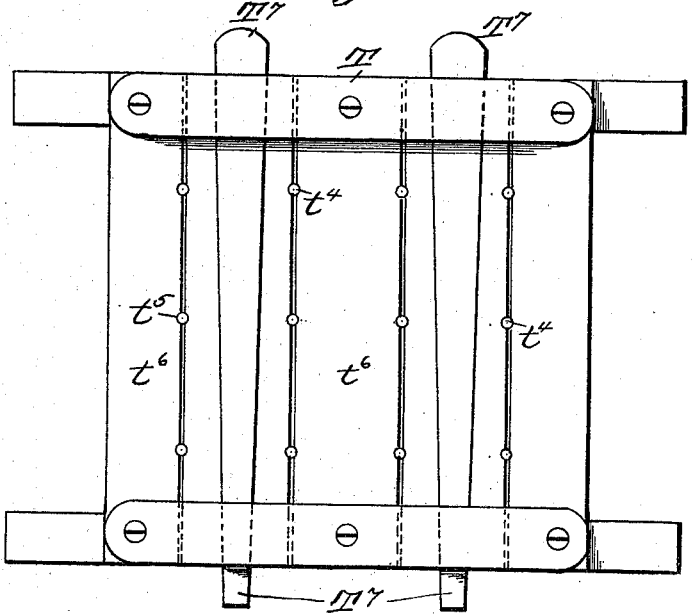

Figure 1, is a front view in elevation; Fig. 2, an opposite rear elevation; Fig. 3, a side elevation; Fig. 4, a plan; Fig. 5, a horizontal section on line 1, 1, of Fig. 1; Fig. 6, a vertical section on line 2, 2, of Fig. 1; Fig. 7, a horizontal section on line 3, 3, of Fig. 1; Fig. 8, a horizontal plan of the ramming device; Figs. 9 and 10, details of the rammers; Fig. 11, a top plan of the flask and pivoted supporting platform; Fig. 12, a front view in detail of the matter of Fig. 11; Fig. 13, a longitudinal section on line 4, 4, of Fig. 11; Fig. 14, a transverse section on line 5, 5, of Fig. 11; Fig. $14\frac{1}{2}$, a detail of upper half pattern; Fig. 15, a detail sectional view of one side of the flask and its platform, showing the mechanism for locking the same in position and releasing it; Fig. 16, a detail plan of a mold flask; Fig. 17, a front view in detail of a carriage carrying a pressure platen and a perforating device for puncturing air holes in the mold; Fig. 18, a similar view with the puncturing pins thrown up; Fig. 19, a bottom plan of the air hole perforating device, and Fig. 20, a detail of one of the spring foot levers; Figs. 21 and 22, details of top part of a flask.

The frame work of the machine is composed of base A, side slotted standards B, and top cross piece C.

D, is a reversible box table for carrying the mold flask and which is hung at its opposite ends on short shafts $d$, which revolve in journal boxes $d'$, in the side of standards B. The said journal boxes slide in the slots of the standards, extend through the standards and are centrally grooved so as to fit on the edges of the standards on opposite sides of the slot. These journal boxes are secured on opposite sides of the frame to straps $d^2$, to the lower end of each of which straps is pivoted an arm, $d^3$, of a weighted lever $d^4$. These weighted levers $d^4$, used to counterbalance and help raise the table, are secured to the squared ends of a horizontal rotating shaft $d^5$, extending across the machine, as shown in Figs. 2 and 4. The shaft $d^5$, is supported in brackets $d^6$, rising from the base A. The levers $d^4$, help slide the table D, up and down in the side standards by aid of a foot lever E, connected to a short rotating horizontal shaft $e'$, supported in brackets $e^2$, rising from the base. This shaft is secured to one of the weighted levers by a cross arm $e^3$, pivoted at one end to a short pendent arm $e^4$, secured to the outer end of said shaft $e'$, and at its opposite end to a short pendent arm $e^5$, secured to the arm $d^3$, carrying the said weighted lever.

The table D, is provided on its top surface with a square open frame F, secured at its corners to the table.

Within the frame F, is placed a plate G, secured to an under plate G', which latter plate is provided on its under surface with pins $i$, having notches which are adapted to engage with a spring push bar $i^2$, adapted to be pushed by disk $i^3$, on the outside of the table to release said plate from the table.

On top of the plate G, is placed a lower half pattern G², which is a counterpart of an upper half G³, and which may be of any suitable design, so made as to be lifted in a vertical line, and provided on its under surface with pins $g$, to fit into holes in the plate G, as well as in holes in the other half pattern.

The metal frame F, is provided with upwardly projecting pins $g^2$, set in plates which are secured to the frame, the purpose of which pins is to support a box part $g^3$, of a two part flask. The part $g^3$, has handles $g^4$, on opposite sides, and perforated lugs $g^5$, on the remaining sides to receive the said upwardly projecting pins $g^2$, of the frame F. Holes $g^6$, are formed in the plates holding the pins $g^2$, to receive the pins $g^7$, on an upper flask part $g^8$.

In order that when the table D, and frame F, are turned over, the flask part $g^3$, shall continue to be held thereto. I provide the table D, with catch pins $a^4$, which enter into holes formed in the opposite sides of the box $g^3$. These catch pins $d^4$, are carried on vertical screw threaded rods $a^5$, which work in sleeves $a^6$, connected to tooth racks $d^7$, placed within the box. The racks $d^7$, are made to move in opposite directions by a small cog $d^8$, placed between them and secured to a shaft $d^9$, which extends out both sides of the box and has on each of its outer ends a finger disk $d^{10}$. Two disks $d^{10}$, are thus employed in order to operate the catch pins from either side of the box.

In order to adjust and set the screw rods $a^5$, carrying the catch pins $a^4$, at any height to fit into boxes of various heights, I employ screw caps $d^{11}$, fitted to turn on screw rods $a^5$, and on sleeves $a^6$, and after the screw rods are set at the desired height small screws $d^{12}$, in the screw caps are used to prevent the caps from turning by screwing the screws $d^{12}$, against the sleeve $a^6$.

To hold the mold table D, in place when the machine is operated I employ a device shown in Fig. 15, consisting of a flat spring bar H, having one end bolted to a journal box $d'$, sliding in standard B, and its opposite free end provided with a slot. This spring stands out from the side of the standard sufficiently so that when the box is swung down a pin $h'$, extending from the side of the box will come in contact with the face of the spring and enter the slot in the spring as the table reaches its horizontal position, and thus automatically lock the table in place.

To release the table I employ a lever $h^2$, hung to a post $h^3$, inside the table which post carries a finger disk $h^5$, outside the table. On turning this disk the lever $h^2$, is forced through a slot in one side of the table opposite the spring bar H, and against the bar so as to push the bar from its engagement with the pin $h'$. A duplicate pin $h'$, lever $h^2$, post $h^3$, and disk $h^5$, are put in on the opposite side of the table to hold and release it when the position of the table is reversed.

K, is a ramming device composed of separate rammers $l$, the preferred form of which is shown in Figs. 9 and 10, hung in a frame composed of slats $m$, with holes bored through the adjacent sides of the slats to receive the rammers. The slats are held together by a transverse bolt M, one end of which is screw threaded to receive a thumb nut M'. By these means the slats can be loosened so as to release and replace the rammers; and so also to permit the rammers to be adjusted to such length and height as not to injure the mold pattern when the ramming is done. Thus the rammers directly above the mold may be adjusted so as to not quite strike the pattern while these rammers beyond the mold will be lengthened to strike below and around the surfaces of the pattern. The rammer frame K, is hung on a vertical shaft $K^2$, which is reciprocated through a dome $K^3$, by means of a weighted lever $K^4$. The lever $K^4$, is hung on horizontal shaft $K^5$, extending transversely across and through the top of the frame work. The horizontal shaft $K^5$, and the vertical shaft carrying the rammer frame are connected by means of two arms $K^6$, and $K^7$, pivoted to each other at their inner ends and respectively to said shafts at their outer ends.

P', $P^2$, are sand holders and screens, respectively provided with finer and coarser wire screen bottoms $p^3$ and $p^4$, and which screens are hung on the opposite standards so as to be swung over the flask when the sand is to be deposited therein, and back out of the way when not in use. Fine sand is first sifted into the flask and then a coarser grade, as is usually the practice.

R, is a platen with side lugs $r'$, to fit into the slots of the side standards B, in which it is slid up and down. The object of this platen is to receive and support the flask after the mold has been formed and the mold and table reversed, and while the mold is being perforated by venting needles from a carrier below. For the latter purpose the platen R, is perforated with holes to receive tubes $r^4$, through which venting needles are forced.

S, is a frame cast on or otherwise attached to the under surface of the platen R, having separated cross pieces $r^3$, provided with the tubes $r^4$.

T, is a venting pin frame hinged by arms $t'$, to cross rotating shafts $t^2$, journaled on the under surface of the platen R, and which frame is lowered and raised to and from said platform, and against the under surface of the frame S, by a lever $T^3$, secured to the end of one of the shafts $t^2$. The shafts $t^2$, are connected at the rear of the frame by a link $o$, pivoted to the swinging arms $t'$, which arms are provided with pins $o'$, to slide in grooves formed on the inside of the frame. On the front side of the frame the end of one of the shafts $t^2$, on which the lever $T^3$, is hung, has an arm $t'$, pivoted to a plate $n'$, by a pin $n^2$, which pin slides in a groove on the inside of the frame, and which plate is held in place by lugs $n^4$. On the same side of the frame the end of the opposite shaft is also provided with a pin $o'$, which slides in a groove on the inside of the frame. By the means just described the pin frame is given a positive uniform, even, up and down movement.

The venting pins $t^4$, are secured to the frame T, by being passed through holes $t^5$, formed in the adjacent edges of the slats $t^6$, and are held in that position by the slats being wedged together by wedge plates $T^7$. When the frame T, is forced up by the lever $T^3$, the venting pins $t^4$, enter the tubes $r^4$, and are carried up through the said tubes through platen R, and through the mold, outside the half pattern.

In order that the venting pins may be adjusted so as not to penetrate the pattern itself and be adapted to conform to the shape of any pattern I arrange them as above described, so that each pin may be separately put in its frame between the slats, lowered or raised to its desired position and there fixed by the wedge-plates $T^7$. The platen R, the tube frame S, and the pin frame T, being all connected, are raised and lowered in the side standards B, by foot lever V, pivoted to one end of a shaft $v'$, journaled in brackets $v^2$, rising from the bed plate. To the opposite end of the shaft $v'$, is secured jointed arm $v^3$, pivoted to a pin $x$, on the inner side of lug $r'$, of the platen R, see Figs. 1 and 6. Pivoted to the same pin is a jointed arm $v^4$, secured to the end of a cross rotating shaft $v^5$, journaled in brackets rising from the bed plate. To the opposite end of shaft $v^5$, is secured a weighted lever $v^6$, having a jointed arm $v^7$, extending and connected to the inner side of an opposite lug $r'$, of platen R, the purpose of said weighted lever being to counterbalance the weight of the platen and other frames S, and T, and to assist in raising the same.

The foot lever E and V, shown in detail in Figs. 1 and 20, are each composed of a foot piece and three segmental toothed plates $w$, $w$, $w$, hung at their upper ends on a pin $w'$, beneath the foot piece. These plates $w$, pass through an open plate $w^2$, in the bed of the machine, which plate $w^2$, on one side of the opening is provided with downwardly inclined ledge $w^3$, to engage with the teeth of the segments, to hold the levers and the parts moved thereby in place when pressure on the levers is removed. The segments at their upper ends extend on one side above their supporting pin $w'$, forming projections $w^4$. The foot piece turns on pin $w'$, and when so turned the toe of the foot lever forces the segments out of engagement with the ledge $w^3$, and the segments are forced downward as the pressure continues. A separate plate $w^5$, secured within the bed frame is adapted to bear upon each separate segment. The object of this arrangement is, when the foot pressure is relieved, to throw each of the toothed segments in engagement with the ledge $w^3$, of the plate $w^2$, and three segments and three separate springs are employed to insure the safe locking of the levers, as in event of any one of the segments failing to catch or hold on, the weight will be held by the others.

The operation of the machine is as follows:—One or more half patterns of any design are placed inside the hollow square frame F, and screwed on plate G, of table D. Then the lower half flask is placed around such half patterns, within said open frame and secured to the plate G, in the manner already described. Then the rammers are adjusted and set to agree with the shape of the half patterns, so as to tamp the sand without injuring the patterns. Then the table is reversed and the venting pins are adjusted to the patterns, so as to not penetrate the pattern. Then the table is reversed and the screen boxes filled with green sand. Sand from the fine screen is first sifted in, then the flask filled up with coarse sand from the other screen. The sand is then tamped by reciprocating the rammer frame by means of the handle attached to the weighted lever secured to the rammer frame shaft. The table D, is then reversed and the platen R, and venting frame forced up by a foot lever until the platen meets the under surface of the table. The venting pin frame is then forced up by lever $T^3$, and the venting pins made to penetrate the mold, and then withdrawn by a reverse movement of the lever. The plate on which the pattern has been fixed and which is now on the under side of the table is released by pushing in the central push-rod whereupon such a plate falls and rests upon the flask. The flask is then released and removed from the table with the plate as its top. I then loosen the plate from the flask by lightly striking the holding pins on the plate and remove the same. I then place the upper half pattern $G^3$, on the lower already completed, and the upper half of flask on the lower half thereof. Then a little dry sand is dropped in the box so as to prevent the two half molds from sticking together when subsequently separated, and the top half pattern is then molded in sand with hand in the usual way. This operation by hand is only followed at the outset of the process for the purpose of providing a second plate to be placed in the table with an upper half pattern to correspond exactly in position thereon with its counter-part lower half pattern, and from which all subsequent upper half patterns are molded. To effect this I first provide the under plain surface of the upper half pattern $G^3$, with small upwardly projecting pins $g^{11}$, for the purpose of marking on the second plate to be put in the mold table D, the position on that plate where the top half pattern must be secured. Proceeding with the operation, I now remove the upper half $g^8$ of the flask, together with the upper half pattern, from the lower half flask, and place it on the platen R, with pins $g^{11}$, of upper half pattern pointing upward. Then I put the second plain surface plate, of the same size as the first plate, inside the square open frame F, of the table. Then I move the table down so that the side pins $g^7$, on the sides of the upper flask $g^8$, engage with the holes $g^6$, in the plates in the frame F, to hold the upper half flask in position between the table and the platen. When the table is thus moved down then the said pins enter the surface of the descending plate and thus mark thereon the position where the upper half pattern is to be subsequently secured. When the marking is thus done the said plate is released from the table by pushing in the central push rod above described, and the table moved up out of the way. Then the upper flask and the plate are removed from the platen R, and the upper half pattern removed from the upper half flask and screwed to the plate in the position before indicated by the punctured marks. I then remove the lower half pattern from the lower half flask and screw it to the first plate in the same position it first occupied. I now have opposite plates provided with exactly counterpart half patterns, from which any number of molds may be successively made by my machine by the operation already described. In changing the patterns the same operation must be followed.

Although I have described my machine as operated by hand and foot power yet any desired power may be employed to operate the same.

The shape of the tampers $l$, and the form and arrangement of a number of parts of my machine can be changed, and obvious mechanical equivalents adopted without departing from my invention.

Having thus described my invention, what I claim is—

1. In a mold making machine, the combination with a supporting frame of a detachable, reversible, and sliding table on which the molding is done, and a vertically reciprocating tamping frame provided with adjustable rammers, adapted to ram the sand around a pattern placed within a half flask on said table, substantially as described.

2. In a mold making machine, the combination with a suitable supporting frame, of a detachable, reversible, vertically reciprocating mold table, a vertically reciprocating tamping frame provided with adjustable rammers, a vertically reciprocating platen below said mold table, and a frame attached to said platen provided with venting pins, said platen perforated to permit said pins to be forced through the same into the mold, and means for operating said several parts, substantially as described.

3. In a mold making machine, a detachable, reversible, vertically reciprocating mold table, provided with a square open detachable frame F, a plate G, placed within said frame on which is secured a half pattern, an under plate G', to which the former plate is secured, the plate G', provided on its under surface with notched pins, and a spring push bar adapted to release said plate, substantially as described.

4. The tamping frame K, composed of separate slats and a screw bolt to hold said slats together, in combination with separate, independent adjustable rammers, held in position by said slats, substantially as described.

5. In combination with a platen, a frame secured to the under surface of said platen and provided with tubes extending through said platen, a venting pin frame pivoted to said platen, a lever for raising the said connected platen tube frame and pin frame, together, and a separate lever connected to said venting frame for lifting the same against the said platen and forcing the pins through the same, substantially as and for the purpose described.

6. In a mold making machine, a venting pin frame T, composed of the separate slats for holding the pins, and the wedges $T^7$, whereby said pins may be adjusted and set, substantially as and for the purpose described.

7. The combination of the table, the platen beneath the said table, the vent frame and pins beneath the said platen, the foot levers connected with and operating the table, platen and venting frame and pins, said levers composed of segmental toothed plates, the foot piece, an open plate on the base provided with a projecting ledge to engage with each plate, and a spring plate for each segment, substantially as and for the purpose described.

8. The combination of the two flask halves parts $g^3$ and $g^8$, the pattern half $G^2$, pattern half $G^3$, provided with pins $g^{11}$, the table D, and the plates G and G', substantially as and for the purpose described.

9. The mold table D, provided with the vertically adjustable catch pins $a^4$, for holding a half flask to the table, in combination with racks and a pinion and finger shaft, for moving said pins laterally to lock the flask, and a screw and screw cap for adjusting the said pins vertically and sleeves in which said pins are adjusted, substantially as described.

10. In combination with a mold table D, provided on its top surface with an open frame F, a plate G, within said frame, a half pattern provided with pins to enter said plate, an under plate G', secured to plate G, and provided on its under surface with notched pins $i$, and a spring push bar $i^2$, $i^3$, adapted to engage with said notched pins, substantially as described.

In testimony whereof I affix my signature in presence of two witnesses.

LOUIS RIBEREAU Y MARTEAUX.

Witnesses:
 JOS. H. BLACKWOOD,
 WALTER O. BLACKWOOD.